US006151982A

United States Patent [19]

Matsumoto et al.

[11] Patent Number: 6,151,982

[45] Date of Patent: Nov. 28, 2000

[54] STEERING APPARATUS FOR A CAR

[75] Inventors: Sakae Matsumoto, Takasaki; Shoji Oka, Gunma-ken, both of Japan

[73] Assignee: NSK Ltd., Tokyo, Japan

[21] Appl. No.: 09/231,172

[22] Filed: Jan. 13, 1999

[30] Foreign Application Priority Data

Feb. 6, 1998 [JP] Japan .................................. 10-039852

[51] Int. Cl.[7] ........................................................ B62D 1/18

[52] U.S. Cl. ................................ 74/493; 74/531; 188/67; 403/109.5; 403/109.7

[58] Field of Search ..................... 74/493, 531; 280/775; 188/67; 403/109.5, 109.7, 110

[56] References Cited

U.S. PATENT DOCUMENTS

| | | | |
|---|---|---|---|
| 4,709,592 | 12/1987 | Andersson | 74/493 |
| 5,634,534 | 6/1997 | Kanai et al. | 188/67 |
| 5,813,289 | 9/1998 | Renick et al. | 74/493 |

FOREIGN PATENT DOCUMENTS

| | | |
|---|---|---|
| 0 345 101 | 2/1992 | European Pat. Off. . |
| 59-43168 | 12/1984 | Japan . |
| 60-34954 | 3/1985 | Japan . |
| 63-44295 | 11/1988 | Japan . |
| 2-24366 | 7/1990 | Japan . |

*Primary Examiner*—Allan D. Herrmann
*Attorney, Agent, or Firm*—Vorys, Sater, Seymour and Pease

[57] ABSTRACT

A steering apparatus for a car, comprises a steering shaft provided with a steering wheel at one end thereof, a steering column for supporting the steering shaft to be freely rotatable, an upper support mechanism fixed to the car body side for supporting the steering column, having an operating lever capable of taking a state for allowing the steering column to move in the axial direction and a state for fixing the steering column, so as to selectively take one of these two states and a lower support mechanism fixed to the car body side for supporting the steering column. The lower support mechanism comprises, a lower bracket fixed to the car body, a frictional member provided between the lower bracket and the steering column, capable of taking a first position for frictionally engaging with the lower bracket and the steering column to prevent a movement of the steering column and a second position for releasing the frictional engagement, and a link mechanism for moving the frictional member between the first position and the second position in interlocking with the operating lever.

16 Claims, 5 Drawing Sheets

STEERING APPARATUS FOR A CAR

This application claims the benefit of Japanese Application No. 10-039852 which is hereby incorporated by reference.

BACKGROUND OF THE INVENTION

1. Field of the Invention

The present invention relates to a steering apparatus for a car which is capable of inclining a steering wheel to perform a tilt adjustment, and axially moving the steering wheel to perform a telescopic adjustment of the axial position thereof, and more specifically, to a steering apparatus for a car which is capable of enhancing the rigidity of a steering column, or the like, by positively preventing a backlash of the steering column, or the like, and obtaining an excellent operability for telescopic adjustment by decreasing the operating force of telescopic adjustment, so as to reduce the processing cost.

2. Related Background Art

In Japanese Utility Model Publication No. 2-24366, there is disclosed a steering apparatus for a car which can perform a tilt adjustment of the steering wheel as well as a telescopic adjustment of the length of the steering apparatus by moving the steering wheel in the axial direction. A steering apparatus constituted in accordance with this publication is shown in FIG. 7. Referring to FIG. 7, a spline shaft 3 is spline-fitted in a lower part of a steering shaft 1 which is supported to be freely rotatable by a steering column 2, and a universal joint 4 is coupled to a lower part of this spline shaft 3.

The steering column 2 is provided with an upper bracket 5 fixed to the car body and a distance bracket 6. A fastening bolt 9 with an operating lever 10 is inserted through two holes, that is, an elongated hole 7 for tilt adjustment formed on this upper bracket 5 and an elongated hole 8 for telescopic adjustment formed on the distance bracket 6.

An outer tube 11 is attached to a lower part of the steering column 2, and a spherical bush 12 is fitted on the outer periphery of the outer tube 11. A bush holder 13 slidably in contact to this spherical bush 12 is mounted on a lower bracket 14 fixed to the car body. An O-ring 15 is fitted in a groove which is formed on the top of the spherical bush 12. This O-ring 15 not only comes in tight contact with the bush holder 13, but also brings the inner peripheral surface of the spherical bush 12 into tight contact with the outer peripheral surface of the outer tube 11 to fasten together. Since the spherical bush 12 and the O-ring 15 are brought into slidable contact with the bush holder 13 as described above, a backlash or the like which may be caused by vibration of the steering wheel or the like in a high-speed running can be prevented.

In the steering apparatus as mentioned above, when the steering wheel is to be subjected to a tilt adjustment, if the operating lever 10 is loosened, the steering shaft 1 and the steering column 2 are inclined and, at the same time, the fastening bolt 9 is guided along the elongated hole 7 for tilt adjustment of the distance bracket 6. On this occasion, if the axial length of the steering shaft 1 is also required to be finely adjusted, the steering shaft 1 which is spline-fitted in the spline shaft 3 is moved in the axial direction with respect to the spline shaft 3. After the adjustment, the operating lever 10 is fastened up.

When the position of the steering wheel 10 is to be adjusted by telescopically adjusting the length of the steering apparatus, if the operating lever 10 is loosened, the steering shaft 1 which is spline-fitted in the spline shaft 3 is moved together with the steering column 2 and the outer tube 11 in the axial direction with respect to the spline shaft 3. At the same time, the fastening bolt 9 is guided along the elongated hole 8 for telescopic adjustment of the distance bracket 6.

When this outer tube 11 is to be moved in the axial direction, since the spherical bush 12 is fastened up by the O-ring 15 so that the inner peripheral surface of this spherical bush 12 is all the time in tight contact with the outer peripheral surface of the outer tube 11, the outer tube 11 is required to be moved against the tight-contacting force coming from the inner peripheral surface of this spherical bush 12.

In Japanese Utility Model Publication No. 59-43168, there is also disclosed a steering apparatus of tilt adjustment type in which the steering wheel is to be tilted. In this publication, a steering column is supported by two brackets, namely, an upper bracket and a lower bracket, and each of these two brackets has two fastening means for tilting the steering column. These two fastening means are linked together by a link mechanism in such a manner that one of the fastening means is actuated by operating the other. Since the fastening means of each bracket are operated by the link mechanism while preventing a backlash or the like caused by a vibration in high-speed running in this manner, the tilt adjustment can be performed with a simple operation.

In the steering apparatus for tilt adjustment and telescopic adjustment disclosed in Japanese Utility Model Publication No. 2-24366 mentioned above, the spherical bush 12 and the O-ring 15 are brought into slidable contact with the bush holder 13 as described above, so as to prevent a direct backlash from the outer tube 11. However, the spherical bush 12 is all the time fastened up by the O-ring 15 so that a small gap is formed between the spherical bush 12 and the bush holder 13. As a result, if a bending load with a certain measure of magnitude is applied on the steering wheel, the outer tube 11 and the like are moved to the extent of this small gap, so as to decrease the rigidity of the steering apparatus.

Though the steering shaft 1 and the outer tube 11 are moved in the telescopic operation as mentioned above, the spherical bush 12 is fastened up by the O-ring 15 in this case so that the inner peripheral surface of this spherical bush 12 is all the time in tight contact with the outer peripheral surface of the outer tube 11, the outer tube 11 is required to be moved against the tight-contacting force coming from the inner peripheral surface of this spherical bush 12, so that a large force is required as a telescopic operational force for moving the outer tube 11, etc., which results in a deteriorated operability.

Further, a surface of the bush holder 13 to be brought into tight contact with the spherical bush 12 is required to be spherically processed with accuracy, which may result in an increased processing cost.

Also, in the tilt-type steering apparatus disclosed in the above-mentioned Japanese Utility Model Publication No. 59-43168, while a backlash or the like caused by a vibration in high-speed running is prevented by use of the two brackets, the fastening means of each bracket is operated via the link mechanism, so that the tilt adjustment can be performed with a simple operation. However, it is difficult to apply such arrangement of this link mechanism as it is to a steering apparatus capable of telescopic adjustment as well as tilt adjustment.

SUMMARY OF THE INVENTION

The present invention has been conceived taking the above-mentioned circumstances into consideration, and aims as its object of providing a steering apparatus for a car which can securely prevent a backlash or the like of a steering column, etc., to enhance the rigidity of the steering column, etc., decrease a telescopic operational force to obtain an excellent telescopic operability and reduce the processing cost thereof.

In order to achieve the above object, there is provided, according to the present invention, a steering apparatus for a car, comprising:

a steering shaft provided with a steering wheel at one end thereof;

a steering column for supporting the steering shaft to be freely rotatable;

an upper support mechanism fixed to the car body side for supporting the steering column, having an operating lever capable of taking a state for allowing the steering column to move in the axial direction and a state for fixing the steering column, so as to selectively take one of these two states; and a lower support mechanism fixed to the car body side for supporting the steering column, wherein the lower support mechanism comprises:

a lower bracket fixed to the car body;

a frictional member provided between the lower bracket and the steering column, capable of taking a first position for frictionally engaging with the lower bracket and the steering column to prevent a movement of the steering column and a second position for releasing the frictional engagement; and a link mechanism formed between the operating lever and the frictional member for moving the frictional member between the first position and the second position in an interlocking manner with the operating lever.

As described above, according to the present invention, the frictional member for preventing the movement of the steering column is interposed between the lower support member on the car body side and the steering column to freely advance or retreat, and this frictional member is coupled to the link mechanism which is extended from the operating lever so as to be fictionally engaged with the lower support member on the car body side and steering column or released from such frictional engagement in a association with an operation of the operating lever.

Accordingly, if, for example, the telescopic operation is to be performed, when the operating lever is operated, the frictional member is retracted from between the lower support member on the car body side and the steering column, in interlocking therewith. As a result, the steering column is brought into a state in which it is not detained by the lower support member on the car body side. More strictly speaking, a gap is formed between the steering column and the frictional member and an another gap is formed between the frictional member and the lower support member on the car body side. For this reason, the steering column, etc., can be satisfactorily moved telescopically with an extremely lower operational force. On the other hand, after the telescopic adjustment, if the operating lever is operated in a reverse direction, the frictional member is advanced between the lower support member on the car body side and the steering column in interlocking therewith so that the steering column is brought into an unmovable state. For this reason, it is possible to positively prevent a backlash or the like of the steering shaft, the steering column, and the like, so as to obtain a steering apparatus with a high rigidity. It is also possible to conspicuously reduce the processing cost, since a surface of the bush holder to be brought into tight contact with the spherical bush is no longer required to be processed with accuracy, unlike in the conventional apparatus.

BRIEF DESCRIPTION OF THE DRAWINGS

FIGS. 2A and 2B show plan views of a principal portion of the steering apparatus shown in FIG. 1, in which FIG. 2A illustrates a state in which an operating lever is released, and FIG. 2B a state in which the operating lever has been engaged.

FIGS. 4A and 4B show a spherical bush mounted on the steering apparatus shown in FIG. 1, in which FIG. 4A is a side view of the spherical bush, and FIG. 4B is a front view of the spherical bush.

DESCRIPTION OF THE PREFERRED EMBODIMENTS

A steering apparatus for a car according to an embodiment of the present invention will be described below with reference to the drawings.

Figures 1, 1A, 1B:
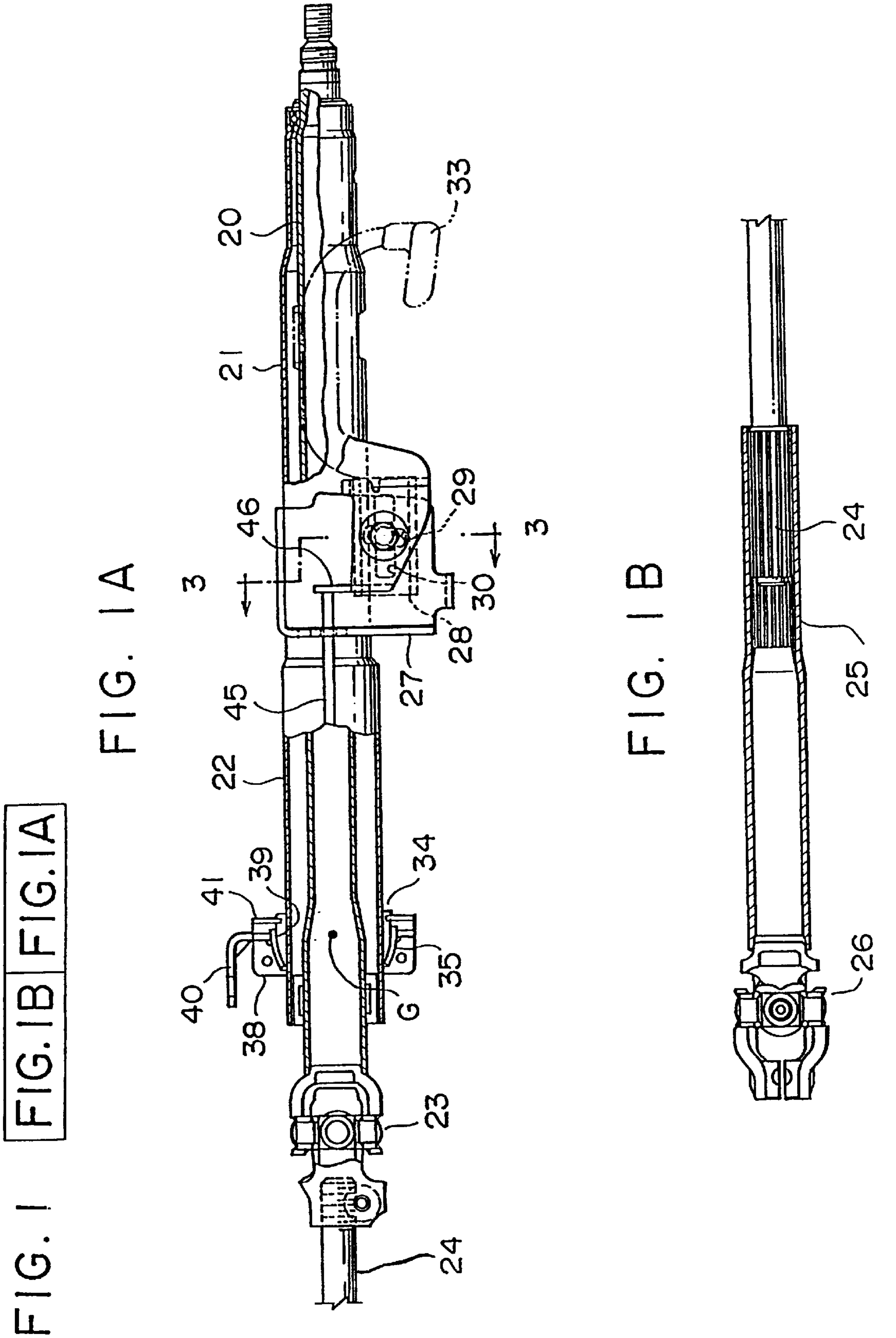
FIG. 1 is composed of FIGS. 1A and 1B and shows a side view containing a partial cross section of a steering apparatus for a car according to an embodiment of the present invention.
Figures 2A, 2B:
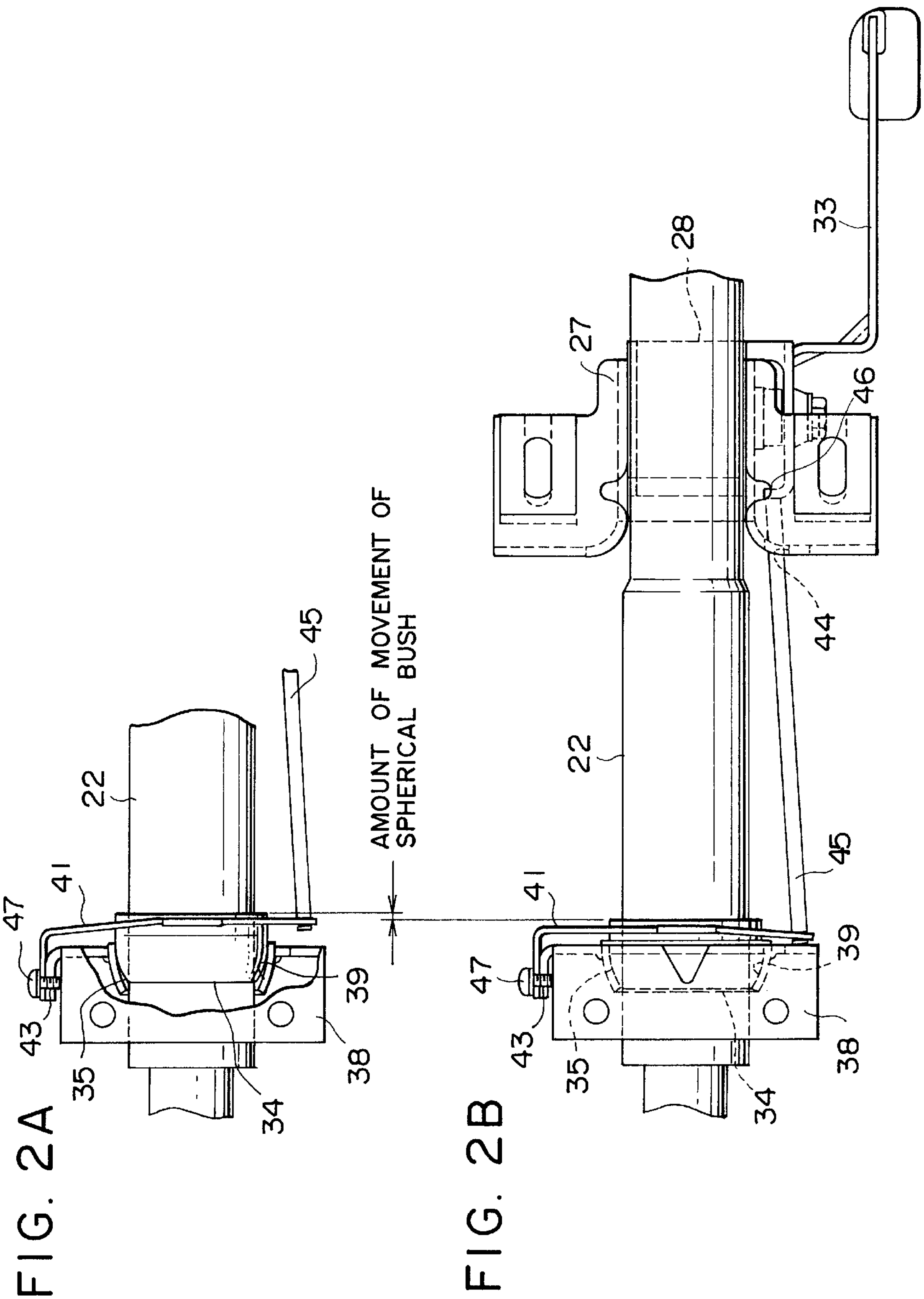
Figure 3:
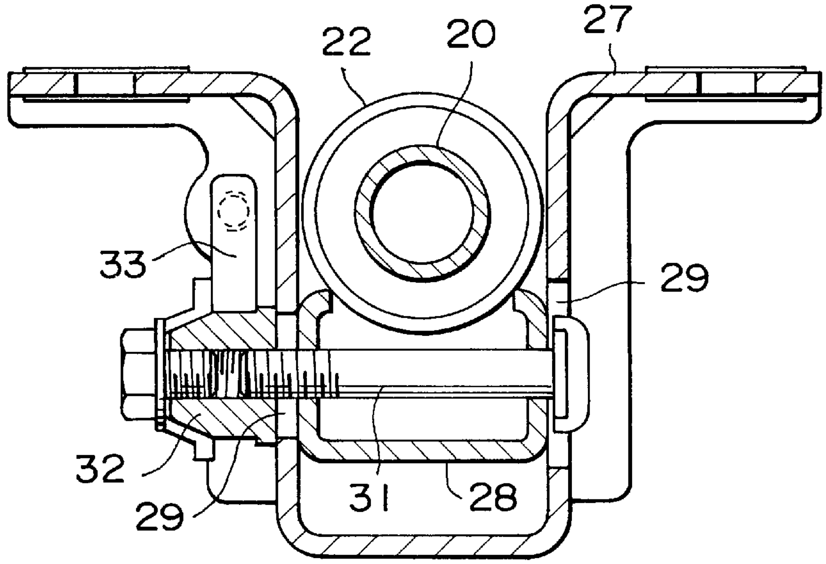
FIG. 3 is a cross sectional view taken along the line 3—3 of FIG. 1A.
Figure 4A:
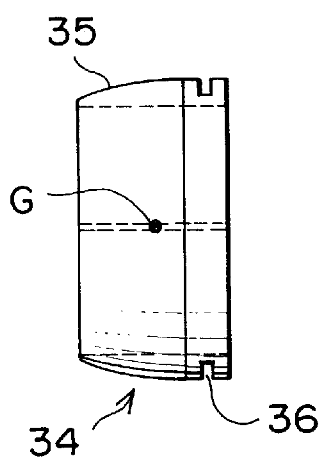
Figure 4B:
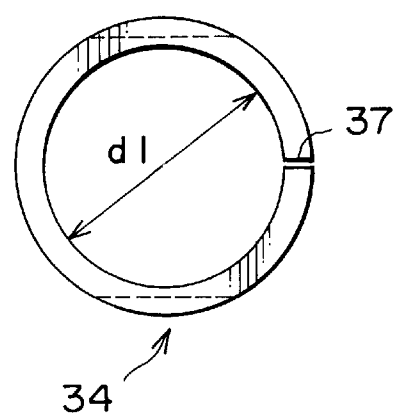
Figure 5:
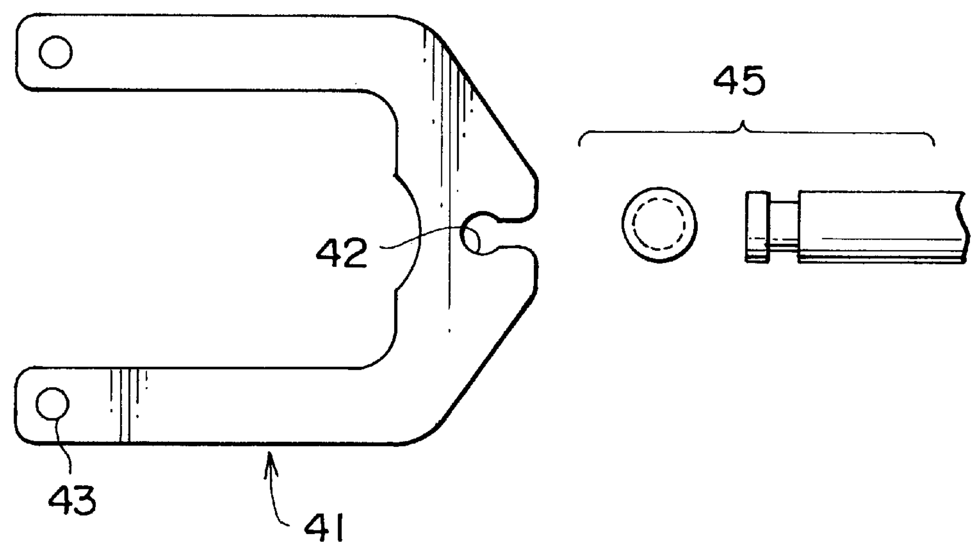
FIG. 5 is a view for explaining a leaf spring and a rod mounted on the steering apparatus shown in FIG. 1.
Figure 6:
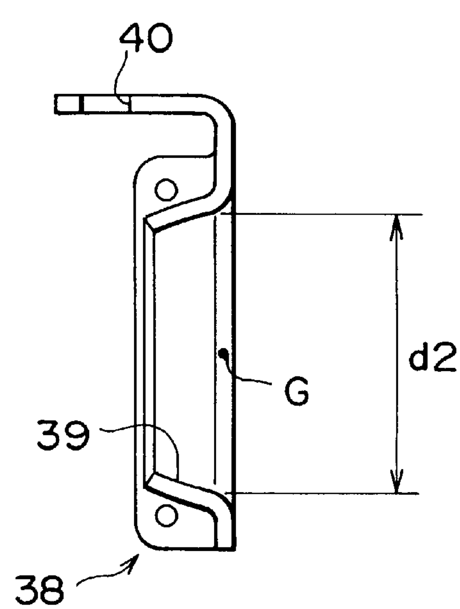
FIG. 6 is a view of a bush holder mounted on the steering apparatus shown in FIG. 1.
Figure 7:
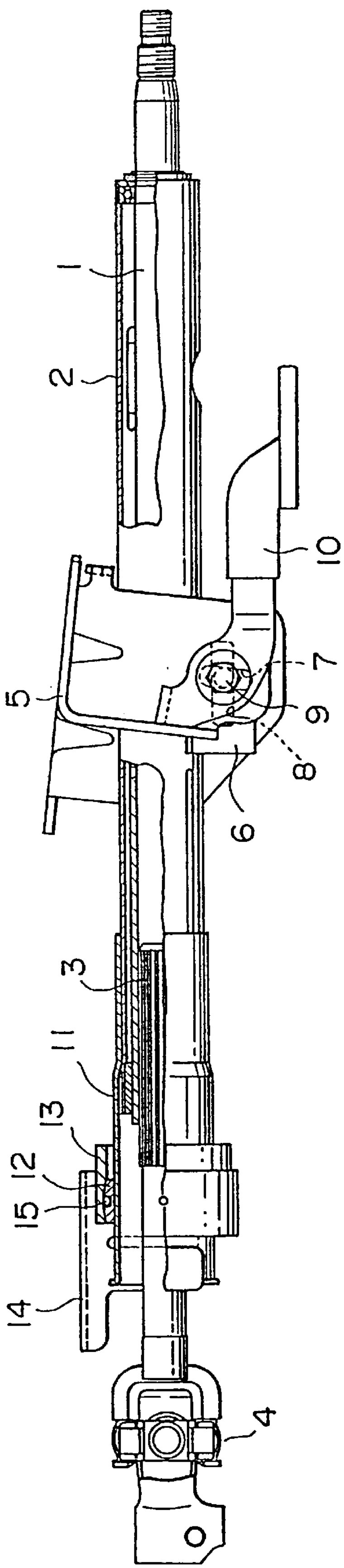
FIG. 7 is a side view containing a partial cross section of a steering apparatus for a car according to the prior art.

FIG. 1 is a side view containing a partial cross section of a steering apparatus for a car according to an embodiment of the present invention. FIGS. 2A and 2B are plan views showing a principal part of the steering apparatus shown in FIG. 1, in which FIG. 2A shows a case in which an operating lever is released, while FIG. 2B shows a case in which the operating lever has been engaged. FIG. 3 is a cross sectional view taken along the line 3—3 of FIG. 1A. FIGS. 4A and 4B illustrate a spherical bush mounted on the steering apparatus shown in FIG. 1, in which FIG. 4A is a side view of the spherical bush, and FIG. 4B is a front view of the spherical bush. FIG. 5 is a view of a leaf spring mounted on the steering apparatus shown in FIG. 1. FIG. 6 is a view of a bush holder mounted on the steering apparatus shown in FIG. 1.

As shown in FIG. 1, a steering shaft 20 is supported to be freely rotatable by a steering column 21, and an outer tube 22 which serves as a lower column member is attached to a lower part of the steering column 21. A universal joint 23 is attached to a lower part of the steering shaft 20, and a spline shaft 24 is coupled to this universal joint 23. This spline shaft 24 is spline-fitted in a spline tube 25, and a universal joint 26 is coupled to a lower part of this spline tube 25.

The steering apparatus is provided with an upper bracket 27, as shown also in FIG. 2B and FIG. 3. A distance bracket 28 is provided inside this upper bracket 27. An elongated hole 29 for tilt adjustment (FIG. 1 and FIG. 3) is formed on the upper bracket 27, while an elongated hole 30 for telescopic adjustment (FIG. 1) is formed on the distance bracket 28. A fastening bolt 31 is inserted through the elongated holes 29 for tilt adjustment and the elongated hole 30 for telescopic adjustment. This fastening bolt 31 is fixed to an operating lever 33 by a fastening nut 32.

An annular spherical bush 34 is fitted on a lower part of the outer tube 22, as shown in FIGS. 2A and 2B. This spherical bush 34 is provided with a spherical outer periphery 35 which is in slidable contact with a spherical portion 39 of the bush holder 38 as well as a groove 36 for fitting a leaf spring 41 (to be described later) therein.

The inner diameter d1 of the spherical bush 34 is set to have a small gap from the outer peripheral surface of the outer tube 22, and the spherical bush 34 is provided with a slit 37. For this reason, as shown in FIG. 2B, when the operating lever 33 is released and the spherical bush 34 is retracted from the bush holder 38, the width of this slit 37 is extended so as to form a small gap between the inner peripheral surface of the spherical bush 34 and the outer peripheral surface of the outer tube 22. As a result, the outer tube 22 can be moved with respect to the spherical bush 34.

On the other hand, as shown in FIG. 2A, when the operating lever 33 is fastened up and the spherical outer periphery 35 of the spherical bush 34 is pressed against the spherical inner periphery 39 of the bush holder 38 by a biasing force of a leaf spring 41 which is to be described later, the width of this slit 37 is narrowed, and the diameter of the spherical bush 34 is reduced, so that the inner periphery of the spherical bush 34 is brought into tight contact with the outer periphery of the outer tube 22 to be pressed. The referential symbol G denotes the center of the spherical surface of the spherical portion 35 and serves as the center of rotation at the tilt adjustment.

As shown in FIG. 1 and FIGS. 2A and 2B, a lower bracket serving as the lower support member on the car body side of the steering apparatus is provided as a unitary structure with the bush holder 38 which is in slidable contact with the spherical bush 34.

This bush holder 38 has, as shown in FIG. 6, the spherical inner periphery 39 is slidably moved on the spherical outer periphery of the spherical bush 34. Since the spherical inner periphery 39 of the bush holder 38 is formed of a portion smaller than the maximum diameter d2 thereof, the spherical outer periphery 35 of the spherical bush 34 can advance to or retreat from the spherical inner periphery 39. In addition, the spherical inner periphery 39 of the bush holder 38 does not contain the maximum diameter d2 thereof, and no strict accuracy is required so long as a backlash can be simply prevented when the spherical inner periphery is pressed against the spherical bush 34. As a result, a low-cost processing method such as a press working can be employed for processing the bush holder 38 so as to reduce the processing cost. Since being formed as a unitary structure with the lower bracket, the bush holder 38 is provided with an attachment hole to be attached to the car body.

The leaf spring 41 is fitted in the groove 36 of the spherical bush 34, as shown in FIGS. 2A and 2B. This leaf spring 41 is formed, as shown in FIG. 5, substantially in a U shape, and has an engagement hole 42 for fitting a rod 45 of a link mechanism (to be described later) therein and an attachment hole 43 for the attachment to the bush holder 38. As shown in FIGS. 2A and 2B, a screw 47 or the like is inserted into this attachment hole 43 so that the leaf spring 41 is attached to the bush holder 38.

There is further provided a link mechanism for advancing and retracting the spherical bush 34 in coordination with a rotation of the operating lever 33. That is, as shown in FIG. 2A, one end of the rod 45 is engaged with the engagement hole 42 of the leaf spring 41, the rod 45 is passed through a through hole 44 of the upper bracket 27 and extended, and the other end of the rod 45 is brought into contact with a pressing plate 46 of the operating lever 33. A muffler member made of rubber or resin may be attached to this pressing plate 46 or the through hole 44.

In this manner, when the operating lever 33 is released, the rod 45 is lifted by the biasing force of the leaf spring 41, as shown in FIG. 2A, and the spherical bush 34 is at a position where it is retracted from the bush holder 38 by the biasing force of the leaf spring 41. On the other hand, when the operating lever 33 is fastened up, as shown in FIG. 2B, the rod 45 is pressed down by the pressing plate 46 of the operating lever 33 against the biasing force of the leaf spring 41, and the leaf spring 41 and the spherical bush 34 are moved by this pressing-down force of the rod 45 so that bush 34 is inserted with pressure into the bush holder 38. With such structure as mentioned above, when the position of the steering wheel is to be telescopically adjusted, if the operating lever 33 is rotated to be released, the fastening bolt 31 is guided along the elongated hole 30 for telescopic adjustment of the distance bracket 28. At the same time, as shown in FIG. 2B, when the rod 45 is lifted by the biasing force of the leaf spring 41, and the spherical bush 34 is retracted from the bush holder 38 by the biasing force of the leaf spring 41. In this manner, a gap is formed between the spherical portion 35 of the spherical bush 34 and the spherical portion 39 of the bush holder 38, while another gap is formed between the inner peripheral surface of the spherical bush 34 and the outer peripheral surface of the outer tube 22 by extending the width of the slit 37 of the spherical bush 34. Therefore, the outer tube 22 can be moved in the axial direction, together with the steering shaft 20 or the steering column 21, with an extremely small operational force. Thus, the telescopic operational force can be conspicuously reduced and a satisfactory telescopic operability can be obtained.

Meanwhile, if the operating lever 33 is rotated in the reverse direction to be fastened up upon completion of the telescopic adjustment, the rod 45 is pressed down by the pressing plate 46 of the operating lever 33 against the biasing force of the leaf spring 41, as shown in FIG. 2B. The leaf spring 41 and the spherical bush 34 are moved by the pressing-down force of the rod 45, and the bush 34 is inserted with pressure into the bush holder 38. Thereby, the spherical portion 35 of the spherical bush 34 is brought into tight contact wit the spherical portion 39 of the bush holder 38, the width of the slit 37 of the spherical bush 34 is reduced, and the diameter of the spherical bush 34 is reduced, whereby the inner peripheral surface of the spherical bush 34 is brought into tight contact with the outer peripheral surface of the outer tube 22. Therefore, it is possible to positively prevent a backlash or the like of the outer tube 22, the steering shaft 20 or the steering column 21 so as to conspicuously enhance the rigidity of these members.

If the steering wheel is to be subjected to the tilt adjustment, when the operating lever 33 is rotated to be released, the fastening bolt 31 is guided along the elongated hole 29 for the tilt adjustment of the upper bracket 27 so that the steering shaft 20, the steering column 21, etc., are rotated around the center G of rotation at the tilt adjustment. In this case, when the steering wheel side is, for example, rotated upward, a lower part of the steering shaft 20 and the universal joint 23 are rotated downward, so that the spline shaft 24 is moved in the axial direction with respect to the spline tube 25, and a fine adjustment in the axial direction is performed so as to absorb this downward rotation. After the adjustment, the operating lever 33 is fastened up.

The present invention is not limited to the above-mentioned embodiment, but is applicable to various modifications thereof.

As described above, according to the present invention, if, for example, a telescopic operation is to be performed, when the operating lever is rotated, the frictional member is retracted from between the lower support member on the car body side and the outer tube in interlocking therewith so that the outer tube is brought into a state in which it is not detained by the lower support member on the car body side. For this reason, it is possible to telescopically adjust the outer tube and the like with an extremely low operational force. On the other hand, after the telescopic adjustment, if the operating lever is rotated in a reverse direction, the frictional member is advanced into between the lower support member on the car body side and the outer tube in interlocking therewith so that the outer tube is brought into a state of unmovable. For this reason, it is possible to positively prevent a backlash or the like of the outer tube, the steering shaft, or the steering column, so as to obtain a steering apparatus with a high rigidity. Also, since a surface of the bush holder in tight contact with the spherical bush is not required to be processed with accuracy, unlike in the conventional apparatus, it is possible to conspicuously reduce the processing cost.

What is claimed is:

1. A steering apparatus for a vehicle, comprising:

a steering shaft constructed to receive a steering wheel at one end thereof;

a steering column supporting said steering shaft to be freely rotatable; and an upper support mechanism and a lower support mechanism both mounted to a body of the vehicle and supporting said steering column for axial movement and tilting movement;

wherein said lower support mechanism comprises:

a lower bracket fixed to the vehicle body and provided with a holding portion, and a frictional member movable between a first position in which said frictional member is in frictional engagement with said holding portion and said steering column to prevent the axial movement and tilting movement of said steering column, and a second position in which said frictional member is released from said frictional engagement and tiltable relative to said lower bracket to allow the axial movement and tilting movement of said steering column.

2. A steering apparatus according to claim 1, wherein said upper support mechanism includes an operating member coupled to said frictional member and operable to move said frictional member between said first and second positions.

3. A steering apparatus according to claim 2, wherein said operating member is coupled to said frictional member by a link mechanism.

4. A steering apparatus according to claim 3, wherein said frictional member comprises a bush fitted on said steering column and having a spherical outer periphery, said holding portion comprises a member with a spherical inner periphery fittable on the spherical outer periphery of said bush, and said bush is coupled to said link mechanism.

5. A steering apparatus according to claim 4, wherein said lower support mechanism further comprises a biasing member biasing said bush toward said second position.

6. A steering apparatus according to claim 1, wherein said frictional member comprises a bush fitted on said steering column and having a spherical outer periphery, and said holding portion comprises a member with a spherical inner periphery fittable on the spherical outer periphery of said bush.

7. A steering apparatus according to claim 1, wherein said lower support mechanism further comprises a biasing member biasing said bush toward said second position.

8. A steering apparatus for a vehicle, comprising:

a steering shaft constructed to receive a steering wheel at one end thereof;

a steering column supporting said steering shaft to be freely rotatable;

an upper support mechanism and a lower support mechanism both mounted to a body of the vehicle and supporting said steering column for axial movement and tilting movement;

wherein said lower support mechanism comprises:

a lower bracket fixed to the vehicle body and provided with a holding portion, and a generally annular frictional member in which said steering column is received, said frictional member being movable between a first position in which said frictional member is frictionally locked between said holding portion and said steering column to prevent the axial movement and tilting movement of said steering column, and a second position in which said frictional member is released relative to said holding portion and said steering column to allow the axial movement and tilting movement of said steering column, the frictional member allowing the steering column to pass therethrough during said axial movement and tilting relative to said holding portion daring said tilting movement.

9. A steering apparatus according to claim 8, wherein said upper support mechanism includes an operating member coupled to said frictional member and operable to move said frictional member between said first and second positions.

10. A steering apparatus according to claim 9, wherein said operating member is coupled to said frictional member by a link mechanism.

11. A steering apparatus according to claim 10, wherein said frictional member comprises a bush having a spherical outer periphery, said holding portion comprises a member with a spherical inner periphery fittable on the spherical outer periphery of said bush, and said bush is coupled to said link mechanism.

12. A steering apparatus according to claim 11, wherein said lower support mechanism further comprises a biasing member biasing said spherical bush toward said second position.

13. A steering apparatus according to claim 8, wherein said frictional member comprises a bush having a spherical outer periphery, and said holding portion comprises a member with a spherical inner periphery fittable on the spherical outer periphery of said bush.

14. A steering apparatus according to claim 8, wherein said lower support mechanism further comprises a biasing member biasing said spherical bush toward said second position.

15. A steering apparatus for a vehicle, comprising:

a steering shaft constructed to receive a steering wheel at one end thereof;

a steering column supporting said steering shaft to be freely rotatable;

an upper support mechanism fixed to a body of the vehicle and supporting said steering column, and further having an operating lever which can be placed, selectively, in a first state for allowing said steering column to move in an axial direction and a second state for fixing said steering column; and a lower support mechanism fixed to the vehicle body and supporting said steering column, wherein said lower support mechanism comprises:

a lower bracket fixed to the vehicle body;

a frictional member provided between said lower bracket and said steering column, and which can be placed in a first position in frictional engagement with said lower bracket and said steering column to prevent movement of said steering column and a second position released from said frictional engagement; and a link mechanism linking said operating lever and said frictional member such that said frictional member is movable between said first position and said second position by operation of said operating lever, and wherein said frictional member comprises a bush fitted on said steering column and having a spherical outer periphery, said lower support member comprises an annular member with a spherical inner periphery fittable on the spherical outer periphery of said bush, and said bush is coupled to said link mechanism.

16. A steering apparatus according to claim 1, wherein said lower support mechanism further comprises a biasing member biasing said bush toward said second position.

* * * * *